(12) United States Patent
Pan

(10) Patent No.: US 11,493,789 B2
(45) Date of Patent: Nov. 8, 2022

(54) HANDLING EQUIPMENT FOR PLACEMENT SHELF OF DISPLAY PANEL

(71) Applicants: HKC Corporation Limited, Shenzhen (CN); Chongqing HKC Optoelectronics Technology Co., ltd., Chongqing (CN)

(72) Inventor: Po-Sung Pan, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 403 days.

(21) Appl. No.: 16/638,633

(22) PCT Filed: Sep. 20, 2017

(86) PCT No.: PCT/CN2017/102459
§ 371 (c)(1),
(2) Date: Feb. 12, 2020

(87) PCT Pub. No.: WO2019/033501
PCT Pub. Date: Feb. 21, 2019

(65) Prior Publication Data
US 2021/0141253 A1    May 13, 2021

(30) Foreign Application Priority Data
Aug. 14, 2017   (CN) .......................... 201710694315.4

(51) Int. Cl.
*B08B 7/00*     (2006.01)
*B08B 13/00*    (2006.01)
(Continued)

(52) U.S. Cl.
CPC .......... *G02F 1/1316* (2021.01); *B08B 7/0028* (2013.01); *B65G 13/02* (2013.01); *B65G 45/00* (2013.01); *G02F 1/1303* (2013.01)

(58) Field of Classification Search
CPC ........... B08B 7/00; B08B 13/00; B65G 13/02; B65G 45/00; G02F 1/1303; G02F 1/1316
(Continued)

(56) References Cited

U.S. PATENT DOCUMENTS

| 6,196,128 B1 * | 3/2001 | Corrado | ................ B41F 23/002 |
| | | | 101/483 |
| 6,705,505 B2 * | 3/2004 | Yoshikawa | .......... B23K 3/0638 |
| | | | 228/248.1 |

(Continued)

FOREIGN PATENT DOCUMENTS

| CN | 204672594 | 9/2015 |
| CN | 206358894 | 7/2017 |

OTHER PUBLICATIONS

US 2006/0243304, Hsu et al., Nov. 2 (Year: 2006).*
(Continued)

*Primary Examiner* — Douglas A Hess
(74) *Attorney, Agent, or Firm* — WPAT, PC

(57) ABSTRACT

A handling equipment for a placement shelf of display panel is provided. The handling equipment includes a rack, a rotatable driving wheel and a cleansing device. The cleansing device is configured to cleanse the driving wheel. The driving wheel and the cleansing device both are disposed on the rack. The cleansing device contacts with the driving wheel. The driving wheel is configured to contact a bottom frame of the placement shelf of display panel. The driving wheel is disposed with a cleaning layer on the radial periphery of the driving wheel.

15 Claims, 4 Drawing Sheets

(51) Int. Cl.
*B65G 13/02* (2006.01)
*G02F 1/13* (2006.01)
*B65G 45/00* (2006.01)

(58) Field of Classification Search
USPC .................................................. 134/15, 44
See application file for complete search history.

(56) References Cited

U.S. PATENT DOCUMENTS

| | | | | |
|---|---|---|---|---|
| 6,708,617 | B2* | 3/2004 | Corrado | B08B 7/0028 |
| | | | | 101/483 |
| 7,803,231 | B2* | 9/2010 | Katano | B08B 1/008 |
| | | | | 15/97.1 |
| 9,361,682 | B2* | 6/2016 | Youngquist | H05K 13/0409 |
| 9,421,757 | B2* | 8/2016 | Egan | B41F 35/06 |
| 10,717,618 | B2* | 7/2020 | Stark | B08B 1/02 |

OTHER PUBLICATIONS

US 2006/0272678, Corrado et al., Dec. 7 (Year: 2006).*
US 2007/0101885, Corrado et al., May 10 (Year: 2007).*
US 2021/00957118, Tseng et al., Apr. 1 (Year: 2021).*

* cited by examiner

HANDLING EQUIPMENT FOR PLACEMENT SHELF OF DISPLAY PANEL

FIELD OF THE DISCLOSURE

The disclosure relates to a handling equipment for a placement shelf of display panel.

BACKGROUND

A cassette (CST) shelf is a tool to place a liquid crystal glass substrate on. The bottom frame of the CST shelf will be contaminated after longtime usage, but no cleaning method is provided at present. Dust and particles will be brought during entering an automatic material handling system. When the dust or particles are attached to a surface of a substrate, the contamination will have disturbing influence on a following manufacturing process of the substrate, such as the short circuit or open circuit of a signal line, even scraping the substrate. The dust or particles longtime accumulated in the device will harm the production condition, as well as the quality of products simultaneously.

Therefore, a problem to be solved in the manufacturing process of the display panel is how to cleanse the impurity on the CST shelf to handle the liquid crystal glass substrate.

SUMMARY

A primary objective of the disclosure is to provide a handling equipment for a placement shelf of display panel, aiming at cleansing impurities on a placement shelf of display panel, and further eliminating the influence of the impurities on the quality of the display panel.

In order to achieve the objective above, a handling equipment for a placement shelf of display panel provided by an embodiment of the disclosure includes a rack, a driving wheel disposed on the rack, and a cleansing device disposed on the rack. The driving wheel is rotatable. The driving wheel is configured to contact with a bottom frame of a placement shelf of display panel. The driving wheel is disposed with a cleaning layer on a radial periphery of the driving wheel. The cleansing device and the driving wheel are contacted, and the cleansing device is configured to cleanse the driving wheel. The cleansing device includes: a tape roller configured to supply a tape, a take-up roller configured to roll up the tape, a tape-pressing roller configured to press the tape, a middle roller, and a lifting device configured to make the middle move up and down. The tape roller and the take-up roller are disposed below the driving wheel. The tape roller and the take-up roller are operative to make the tape contact with the driving wheel. The tape-pressing roller is disposed on a position/positions adjacent to the tape roller and/or the take-up roller. The middle roller is disposed between the tape roller and the take-up roller, and the middle roller is disposed higher than the tape roller and the take-up roller. The tape is lapped over the middle roller. The lifting device and the middle roller are connected.

In order to achieve the objective above, an embodiment of the disclosure further provides a handling equipment for a placement shelf of display panel, including a rack, a rotatable driving wheel and a cleansing device configured to cleanse the driving wheel. The driving wheel and the cleansing device are disposed on the rack. The cleansing device and the driving wheel are contacted. The driving wheels are configured to contact a bottom frame of the placement shelf of the liquid crystal display panel. The driving wheel is disposed with a cleaning layer on a radial periphery of the driving wheel.

Optionally, the cleansing device includes a tape roller and a take-up roller configured to roll up the tape. The tape roller and the take-up roller are disposed below the driving wheel. The tape roller and the take-up roller are operative to make the tape contact with the driving wheel.

Optionally, the cleansing device further includes a tape-pressing roller. The tape-pressing roller is connected with the tape roller and/or the take-up roller.

Optionally, the cleansing device further includes a middle roller. The middle roller is disposed between the tape roller and the take-up roller, and the middle roller is disposed higher than the tape roller and the take-up roller. The tape is lapper over the middle roller.

Optionally, the cleansing device further includes a lifting device configured to make the middle roller move up and down. The lifting device and the middle roller are connected.

Optionally, connection lines among centers of the middle roller, the tape roller and the take-up roller form an isosceles triangle.

Optionally, the cleansing layer is made by rubber.

Optionally, the cleansing layer is detachably disposed on the radial periphery of the driving wheel of the driving wheel.

Optionally, the number of the cleansing devices is a plurality of groups. The plurality of groups of cleansing devices are disposed below the driving wheel abreast with an identical interval.

Optionally, the number of the driving wheels is multiple. The multiple driving wheels are disposed on the rack with an identical interval.

Furthermore, in order to achieve the objective above, an embodiment of the disclosure further provides a handling equipment for a placement shelf of display panel. The handling equipment for a placement shelf of display panel includes: a rack, a driving wheel disposed on the rack, and a cleansing device disposed on the rack.

The driving wheel is rotatable. The driving wheel is configured to contact with a bottom frame of the placement shelf of display panel. The driving wheel is disposed with a cleaning layer on a radial periphery of the driving wheel.

The cleansing device and the driving wheel are contacted, and the cleansing device is configured to cleanse the driving wheel.

The cleansing device includes: a tape roller configured to supply a tape, and a take-up roller configured to roll up the tape.

The tape roller and the take-up roller are disposed below the driving wheel. The tape roller and the take-up roller are operative to make the tape contact with the driving wheel.

In embodiments of the disclosure, the handling equipment for a placement shelf of display panel includes a rack, a rotatable driving wheel and a cleansing device configured to cleanse the driving wheel. The driving wheel and the cleansing device are disposed on the rack. The cleansing device and the driving wheel are contacted. The driving wheel is configured to contact the bottom frame of the placement shelf of the liquid crystal display panel. The driving wheel is disposed with a cleaning layer on a radial periphery of the driving wheel. According to the disclosure, the driving wheel is disposed with the cleansing layer, and the rack is disposed with the cleansing device of the driving wheel to cleanse the bottom frame of the placement shelf of display panel in the process of handling, resulting in preventing particles and dust from being brought in the handling system and contaminating the production environment, and further enhancing the cleanness of the display panel.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the drawings.

DETAILED DESCRIPTION OF PREFERRED EMBODIMENTS

Figure 1:
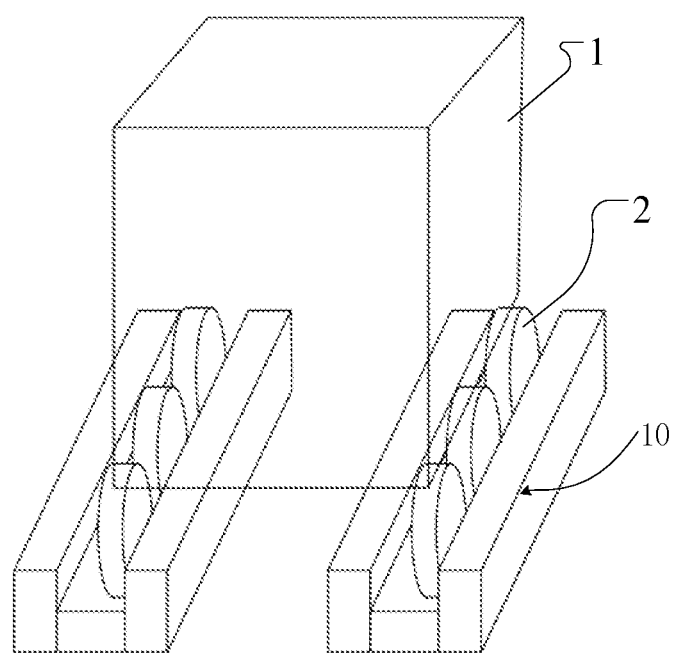
FIG. 1 is a schematic view of a handling equipment for a placement shelf of display panel in operation according to an embodiment of the disclosure.
Figure 2:
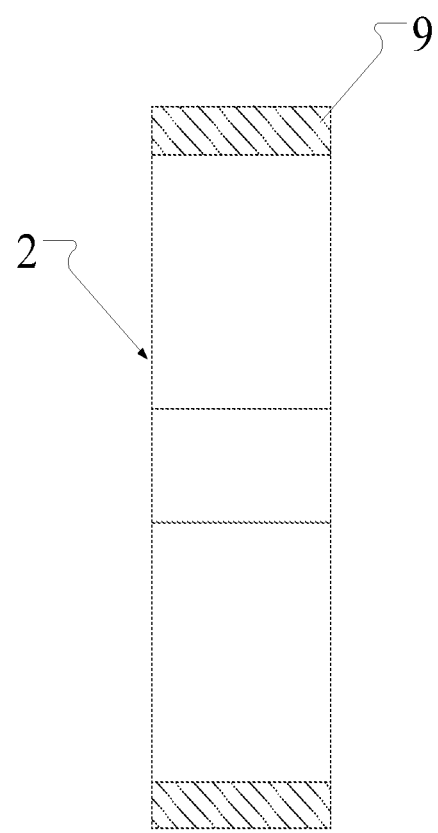
FIG. 2 is a cross-sectional view of a driving wheel in FIG. 1.
Figure 3:
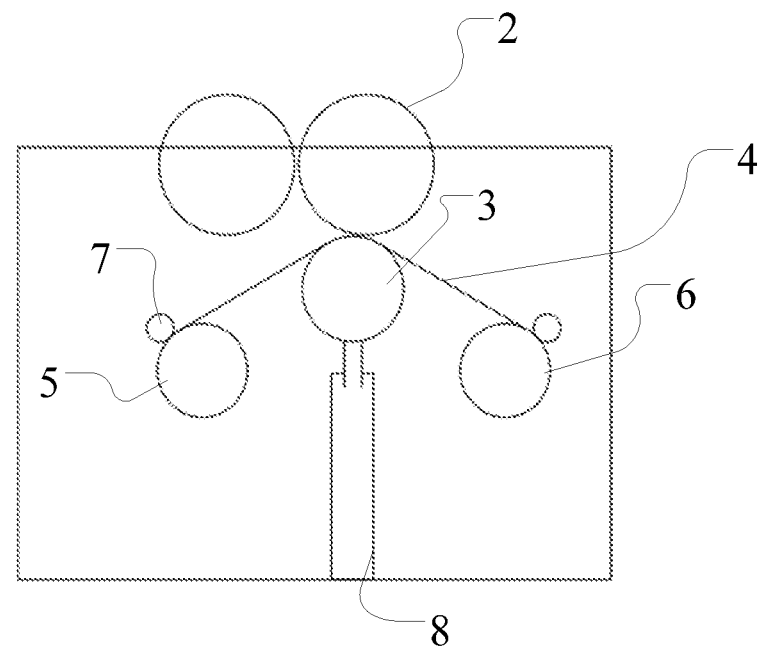
FIG. 3 is a structural principal view of driving wheels and a cleansing device according to an embodiment of the disclosure.
Figure 4:
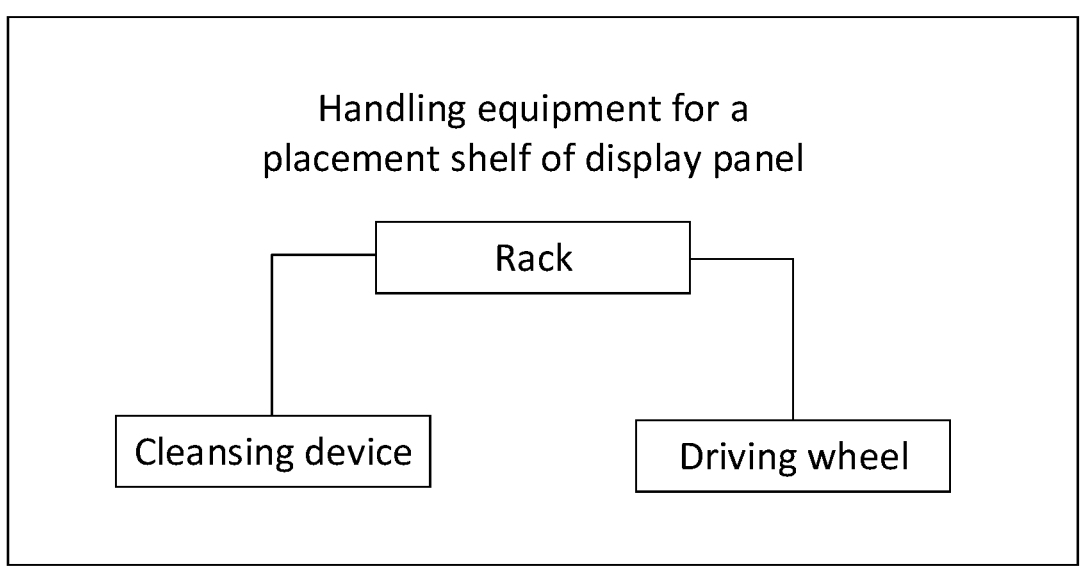
FIG. 4 is a module view of a placement shelf of display panel handling device according to an embodiment of the disclosure.

The achievement of the objective of the disclosure, functional properties and advantages will be further illustrated with reference to embodiments and figures.

Embodiments of the disclosure will be clearly illustrated with reference to the figures of the embodiments of the disclosure. Obviously, the described embodiments are only some embodiments of the disclosure rather than all of them. Based on the embodiments in the disclosure, all the other embodiments obtained by a person skilled in the art without creativity should be included in the protective scope of the disclosure.

All the orientation indications in the embodiments of the disclosure such as upward, downward, left, right, front and rear are intended for explaining a relative position, movement of components in a specific view such as the figure. If the specific view is changed, the orientation indications will be changed correspondingly.

Furthermore, terms such as "first" and "second" are merely for the purpose of illustration and cannot be understood as indicating or implying the relative importance or implicitly indicating the number of the technical features. Therefore, features defined by "first" and "second" can explicitly or implicitly include at least one of the features. In the description of the disclosure, the meaning of "plurality" is at least two, such as two, three, etc., unless otherwise indicated.

In the disclosure, unless otherwise clearly stated and limited, terms "connection" and "fixation" should be understood broadly, for instance, "fixation" can be a fixed connection, a detachable connection or an integral connection; can be a mechanical connection, can also be an electrical connection; can be a direct connection, can also be an indirect connection by an intermediary, can be an internal communication of two elements. A person skilled in the art can understand concrete meanings of the terms in the disclosure as per specific circumstances.

Furthermore, each of the embodiments of the disclosure can be merged, whose basis must be capable of being achieved by a person skilled in the art. When the combination of the embodiments is paradoxical or unavailable, the combination should be regarded as nothing, which is not included in the protective scope of the disclosure.

The disclosure provides a handling equipment for a placement shelf of display panel.

Referring to FIG. 1 through FIG. 5, in an embodiment of the disclosure, the handling equipment for a placement shelf of display panel includes a rack 10, rotatable driving wheels 2 and cleansing devices (not marked) configured to cleanse the driving wheels. The driving wheels and the cleansing devices are disposed on the rack 10. The cleansing devices and the driving wheels 2 are contacted. The driving wheels 2 and a bottom frame of the liquid crystal placement shelf of display panel 1 are contacted. The driving wheel 2 is disposed with a cleaning layer 9 on a radial periphery of the driving wheel.

Figure 6:
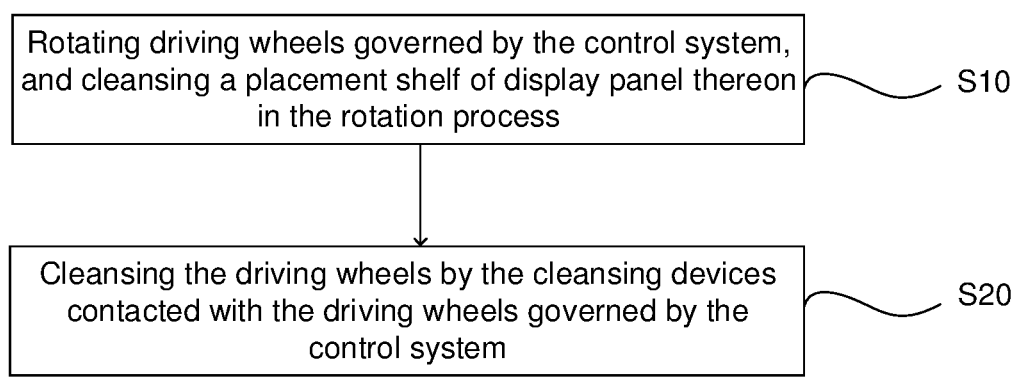
FIG. 6 is an operational flowchart according to an embodiment of the disclosure.

Referring to FIG. 6, an operational process of cleansing the placement shelf of display panel by the handling equipment for a placement shelf of display panel includes:

Step S10, rotating the driving wheels governed by the control system, and cleansing the placement shelf of display panel thereon in the rotation process.

Step S20, cleansing the driving wheels by the cleansing devices contacted with the driving wheels governed by the control system.

In the embodiment, the cleansing layer 9 is disposed on a radial periphery of the driving wheel 2. Impurities such as dust and particles on the bottom frame of the placement shelf of display panel 1 contacted with the driving wheels 2 will be removed by the tape. Impurities such as dust can be reduced on the placement shelf of display panel 1 in the process of handling, resulting in less impurities brought in an automatic material handling system (AMHS) to ensure cleanness in handling. The possibility of the dust and impurities attached to the display panel is lower. The number of the driving wheels 2 is numerousness. The numerous driving wheels 2 are disposed on the rack 10 with an identical interval.

Furthermore, the placement shelf of display panel handling device is further disposed with the cleansing devices configured to cleanse the driving wheels 2. The cleansing devices and the driving wheels are contacted. When the driving wheels 2 adsorb impurities such as particles, dust, etc. on the placement shelf of the liquid crystal display panel 1, impurities on the driving wheels 2 can be removed by the cleansing devices. The driving wheels 2 can repeatedly paste impurities such as dust or particles on the placement shelf of display panel by such design to ensure the cleanness. The function of adsorption of dust or particles on the bottom frame of the placement shelf of display panel by the driving wheels 2 can be guaranteed to reduce the influence of impurities on the placement shelf of display panel on the quality of the panel.

Optionally, the cleansing layer 9 is made by rubber. Rubber can remove impurities on the placement shelf of display panel 1 by adhesive, and rubber will not generate dust. Moreover, the cleansing layer is detachably disposed on the radial periphery of the driving wheel 2. When dust or particles accumulated on the driving wheels 2 to a certain amount, the cleansing layer 9 on the driving wheels 2 can be replaced to prolong the service life of the driving wheels 2.

The driving wheels 2 and the cleansing layer 9 are made by different materials. The driving wheels 2 are primarily configured to bear the placement shelf of display panel 1. The driving wheels 2 are thereby made by relatively hard materials. Conventional driving wheels 2 can be selected according to the budget.

Furthermore, the cleansing device includes a tape roller 5 and a take-up roller 6 configured to roll up the tape. The tape roller 5 and the take-up roller 6 are disposed below the driving wheels 2. The tape roller 5 and the take-up roller 6 are operative to make a tape 4 contact with the driving wheels 2. Specifically, the tape roller 5 and the take-up roller 6 stretch the tape 4 below the driving wheels 2 to ensure the tape 4 and the driving wheels 2 to be contacted. While the driving wheels 2 adsorbs impurities on the placement shelf of display panel 1, the tape 4 can remove the impurities on the driving wheels 2 by adhesive. Furthermore, the take-up roller 6 rolls up the tape 4 with the impurities from the driving wheels 2, and the new tape 4 can continuously stick impurities on the driving wheels 2 to provide an easy utilization effect.

In order to keep the tape 4 to be tightly stretched in operation, the tape roller 5 and/or the take-up roller 6 are disposed with tape-pressing rollers 7. The tape-pressing rollers 7 can press the tape 4 stretched tightly by the tape roller 5 and the take-up roller 6 to enable the tape 4 to be taut without prohibiting the rotation of the driving wheels 2 for efficiently removing the impurities on the driving wheels 2 simultaneously. Optionally, the number of the tape-pressing rollers 7 is two. The two tape-pressing rollers 7 are respectively disposed on the tape roller 5 and the take-up roller 6.

Furthermore, the cleansing device further includes a middle roller 3. The middle roller 3 is disposed between the tape roller 5 and the take-up roller 6. The middle roller 3 is disposed higher than the tape roller 5 and the take-up roller 6. The middle roller 3 is configured to contact the tape 4 stretched by the tape roller 5 and the take-up roller 6. The middle roller 3 and the driving wheels 2 are contacted.

In the embodiment, the tape 4 stretched by the tape roller 5 and the take-up roller 6 contacts the middle roller 3 by disposing the middle roller 3. When the driving wheels 2 roll across the middle roller 3, the tape 4 on the middle roller 3 sticks impurities on the driving wheels 2 for cleansing. The tape roller 5 is wrapped by multiple layers of tape 4. The function of the take-up roller 6 is to roll up the used tape 4. The tape roller 5 and the take-up roller 6 are coordinated in operation. The tape roller 5 is configured to provide the tape 4 and the take-up roller 6 is configured to retrieve the used tape 4, resulting in continuously supplying the clean tape 4 to cleanse the driving wheels 2.

In order to move the cleansing devices to contact the driving wheels 2 for utilization of the cleansing devices, the cleansing device is further disposed with a lifting device 8 connected therewith. Specifically, the cleansing device further includes the lifting device 8 configured to move the middle roller 3 up and down. The lifting device 8 and the middle roller 3 are connected. The lifting device 8 enables the middle roller 3 to be moved up and down. When the driving wheels 2 are in need for cleansing, the middle roller 3 will be lifted to a proper height to contact the driving wheels 2. After cleansing, the middle roller 3 will be descended to a position with some distance from the driving wheels 2. The positions of the cleansing devices can be determined according to requirements by disposition of the lifting device 8 to provide an easily used property. Optionally, the number of the cleansing devices can be numerous groups. The numerous groups of cleansing devices are disposed below the driving wheels 2 abreast with an identical interval. Specifically, the number and position of the cleansing devices can be disposed according to practical requirements.

Furthermore, a line connecting a center of the middle roller 3 and a center of the tape roller 5, a line connecting the center of the middle roller 3 and a center of the take-up roller 6, and a line connecting the center of the tape roller 5 and the center of the take-up roller 6 form an isosceles triangle. In other words, the aforementioned isosceles triangle is formed by connection lines among centers of the middle roller, the tape roller and the take-up roller. The tape 4 on two sides of the middle roller 3 can keep balance during the movement of the lifting device 8. The middle roller 3, the tape roller 5 and the take-up roller 6 can be more balanced simultaneously.

Furthermore, the rack 10 is disposed with orbits for the driving wheels 2 to roll on. The orbits are two parallel disposed orbits. The two orbits are defined with grooves. The grooves are configured to accommodate and mount the driving wheels. The driving wheels 2 are disposed with the same interval on the orbits.

The display panel in the handling equipment for a placement shelf of display panel can be a LCD panel, an OLED panel, a QLED panel, a curved display panel or other display panels.

The handling equipment for a placement shelf of display panel can be applied to hold other electrical devices or non-electrical devices besides the display panel.

Figure 5:
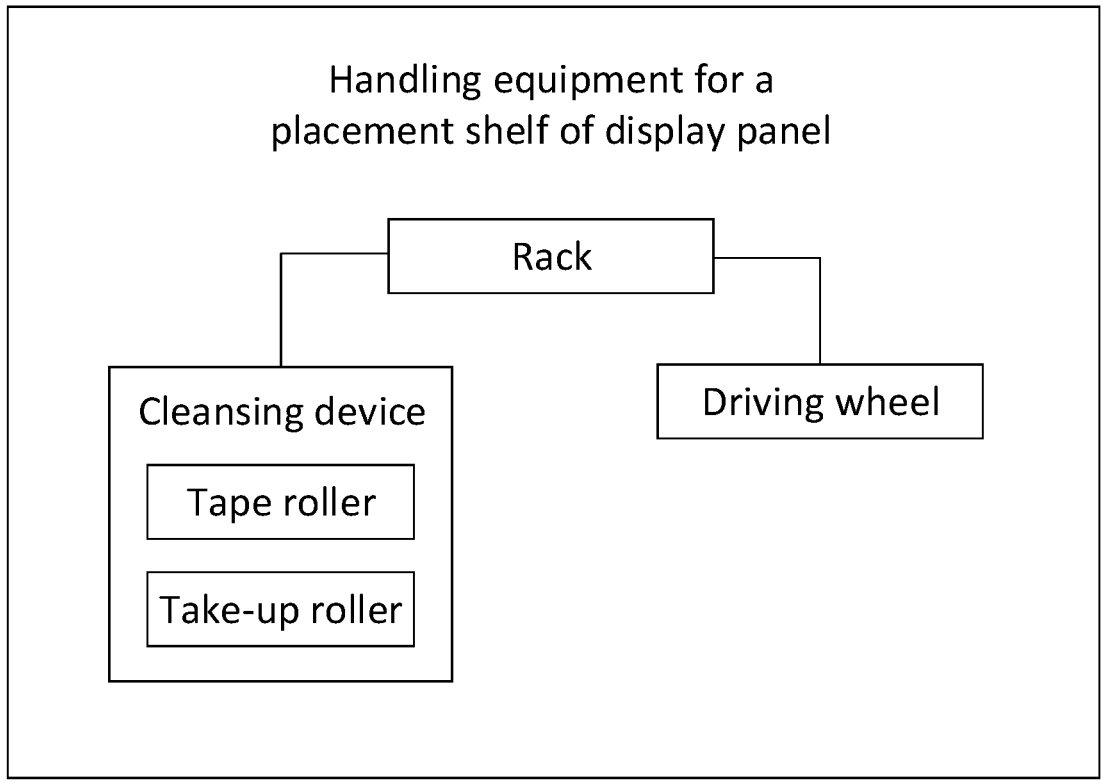
FIG. 5 is a module view of a placement shelf of display panel handling device according to another embodiment of the disclosure.

Furthermore, referring to FIG. 5, the disclosure further provides a handling equipment for a placement shelf of display panel, including the rack 10, a driving wheel disposed on the rack 10, and a cleansing device disposed on the rack 10.

The driving wheel is rotatable. The driving wheel is configured to contact the bottom frame of the placement shelf of display panel. The driving wheel is disposed with the cleaning layer on the radial periphery.

The cleansing device and the driving wheel are contacted, and the cleansing device is configured to cleanse the driving wheel.

The cleansing device includes: the tape roller configured to provide the tape, and the take-up roller configured to retrieve the tape.

The tape roller and the take-up roller are disposed below the driving wheel. The tape roller and the take-up roller are operative to make the tape contact with the driving wheel.

The foregoing contents merely are optional embodiments of the disclosure rather than restricting the protective scope of the disclosure. Equivalent structures according to the embodiments of the disclosure and the figures thereof within the spirit of the disclosure, applied in other relative fields directly or indirectly, should be included in the protection scope of the disclosure.

What is claimed is:

1. A handling equipment for a placement shelf of display panel, wherein the handling equipment comprises:
   a rack;
   a driving wheel, disposed on the rack, wherein the driving wheel is rotatable, the driving wheel is configured to contact with a bottom frame of the placement shelf of display panel, and the driving wheel is disposed with a cleaning layer on a radial periphery of the driving wheel; and
   a cleansing device, disposed on the rack, wherein the cleansing device contacts with the driving wheel and is configured to cleanse the driving wheel;

wherein the cleansing device comprises:
  a tape roller, configured to supply a tape; and
  a take-up roller, configured to roll up the tape, wherein the tape roller and the take-up roller are disposed below the driving wheel, the tape roller and the take-up roller are operative to make the tape contact with the driving wheel;
  a tape-pressing roller, configured to press the tape, wherein the tape-pressing roller is disposed on a position(s) adjacent to the tape roller and/or the take-up roller;
  a middle roller, wherein the middle roller is disposed between the tape roller and the take-up roller, the middle roller is disposed higher than the tape roller and the take-up roller, and the tape is lapped over the middle roller;
  a lifting device, configured to make the middle roller move up and down, wherein the lifting device is connected to the middle roller.

2. A handling equipment for a placement shelf of display panel, wherein the handling equipment comprises:
  a rack;
  a driving wheel, disposed on the rack, wherein the driving wheel is rotatable, the driving wheel is configured to contact with a bottom frame of the placement shelf of display panel, the driving wheel is disposed with a cleaning cleansing layer on a radial periphery of the driving wheel; and
  a cleansing device, disposed on the rack, wherein the cleansing device contacts with the driving wheel and is configured to cleanse the driving wheel;
  wherein the cleansing device comprises:
    a tape roller, configured to supply a tape;
    a take-up roller, configured to roll up the tape, wherein the tape roller and the take-up roller are disposed below the driving wheel, the tape roller and the take-up roller are operative to make the tape contact with the driving wheel;
    a middle roller, wherein the middle roller is disposed between the tape roller and the take-up roller, the middle roller is disposed higher than the tape roller and the take-up roller, the tape is lapped over the middle roller.

3. The handling equipment for a placement shelf of display panel according to claim 2, wherein the cleansing device further comprises:
  a tape-pressing roller, configured to press the tape, wherein the tape-pressing roller is disposed on a position(s) adjacent to the tape roller and/or the take-up roller.

4. The handling equipment for a placement shelf of display panel according to claim 3, wherein the cleansing layer is detachably disposed on the radial periphery of the driving wheel.

5. The handling equipment for a placement shelf of display panel according to claim 3, wherein the number of the cleansing devices is a plurality of groups, and the plurality of groups of cleansing devices are disposed below the driving wheel.

6. The handling equipment for a placement shelf of display panel according to claim 3, wherein the number of the driving wheel is multiple, and the multiple driving wheels are disposed on the rack with an identical interval.

7. The handling equipment for a placement shelf of display panel according to claim 2, wherein the cleansing device further comprises:
  a lifting device, configured to make the middle roller move up and down, wherein the lifting device is connected to the middle roller.

8. The handling equipment for a placement shelf of display panel according to claim 7, wherein connection lines among centers of the middle roller, the tape roller and the take-up roller form an isosceles triangle.

9. The handling equipment for a placement shelf of display panel according to claim 7, wherein the cleansing layer is detachably disposed on the radial periphery of the driving wheel.

10. The handling equipment for a placement shelf of display panel according to claim 7, wherein the number of the cleansing devices is a plurality of groups, and the plurality of groups of cleansing devices are disposed below the driving wheel.

11. The handling equipment for a placement shelf of display panel according to claim 7, wherein the number of the driving wheels is multiple, and the multiple driving wheels are disposed on the rack in an equal interval manner.

12. The handling equipment for a placement shelf of display panel according to claim 2, wherein the cleansing layer is detachably disposed on the radial periphery of the driving wheel.

13. The handling equipment for a placement shelf of display panel according to claim 2, wherein the number of the cleansing devices is a plurality of groups, and the plurality of groups of cleansing devices are disposed below the driving wheel.

14. The handling equipment for a placement shelf of display panel according to claim 2, wherein the number of the driving wheel is multiple, and the multiple driving wheels are disposed on the rack with an identical interval.

15. A handling equipment for a placement shelf of display panel, wherein the shelf handling equipment comprises:
  a rack; and
  a driving wheel, disposed on the rack, wherein the driving wheel is rotatable, the driving wheel is configured to contact with a bottom frame of the placement shelf of display panel, and the driving wheel is disposed with a cleaning cleansing layer on a radial periphery of the driving wheel;
  a cleansing device, disposed on the rack, wherein the cleansing device contacts with the driving wheel, and the cleansing device is configured to cleanse the driving wheel;
  wherein the cleansing device comprises:
    a tape roller, configured to supply a tape; and
    a take-up roller, configured to roll up the tape, wherein the tape roller and the take-up roller are disposed below the driving wheel, the tape roller and the take-up roller are operative to make the tape contact with the driving wheel;
  wherein the cleansing layer is detachably disposed on the radial periphery of the driving wheel.

* * * * *